April 9, 1935.  T. ZUSCHLAG  1,997,164
ELECTRICAL CHARACTERISTICS OF CONDUCTORS
Filed Feb. 16, 1931  2 Sheets-Sheet 1

INVENTOR
Theodor Zuschlag
BY
Pennie, Davis, Marvin Edmonds
ATTORNEYS

Patented Apr. 9, 1935

1,997,164

UNITED STATES PATENT OFFICE 1,997,164

ELECTRICAL CHARACTERISTICS OF CONDUCTORS

Theodor Zuschlag, New York, N. Y., assignor to Swedish American Prospecting Corporation, New York, N. Y., a corporation of New York Application February 16, 1931, Serial No. 516,143

7 Claims. (Cl. 175—183)

This invention relates to the determination of electrical characteristics of electrical conductors, and has for its object certain improvements in the method of and apparatus for determining electrical characteristics of electrical conductors. The invention relates more particularly to the determination of potential drops across electrical conductors, or of the resistances of electrical conductors. The invention also contemplates improvements in the determination of potential drop ratios, and of resistance ratios.

Various proposals have been advanced, and a number of them are of course employed, to determine electrical characteristics of electrical conductors of numerous kinds. For example, the well known Wheatstone bridge is employed to make simple resistance measurements. It involves a zero method and therefore does not depend upon any instrument calibration. The ratio arms of the bridge are indicated in terms of ohmic resistance. A slide-wire pattern of the Wheatstone bridge is sometimes used, in which the ratio arms are calibrated in units of lengths. The Kelvin bridge is often employed where greater accuracy in the determination of low resistances is desired. This latter type of bridge requires the use of extremely fine grade, and therefore relatively high priced, slide resistances. Due to the presence of contact and internal instrument resistances, such bridge devices as are now employed for determining electrical characteristics of electrical conductors are inherently and unavoidably defective. In so far as these unavoidable resistances are concerned, determinations of electrical characteristics of conductors tend to be inaccurate; at least unless ample provision is made to compensate for their adverse effect on the final results, such as by the use of correction factors, or by a limited use of the bridges.

As a result of my investigations, I have discovered a method of and apparatus for determining electrical characteristics of electrical conductors, which may involve the determination of potential drops and of resistances, as well as of potential drop and resistance ratios, that for the most part avoids the difficulties and inaccuracies encountered when using the well known measuring devices. In accordance with my discovery, the desired determinations may be made in such a way as to avoid contact and instrument resistances now encountered in the devices normally employed, and which prove highly troublesome. The apparatus contemplated is simple in construction, relatively cheap materials may be employed, and it may be operated readily and quickly.

The present invention accordingly contemplates in one aspect a method of determining electrical characteristics of an electrical conductor in which a current flows, or is made to flow, through the conductor connected in series with a known or calibrated or ascertainable resistance, or potential drop; also producing a current flow in two parallel circuits associated with the conductor and known resistance, at least one of the parallel circuits being provided with at least one variable resistance; or, both circuits containing at least one common resistance, the value of which may be in whole or in part transferred from one circuit to the other. The resistance of one of the parallel circuits is then set at an arbitrary value, after which the two parallel circuits are balanced by suitably adjusting a resistance in the other parallel circuit until the same current flows through both circuits. The resistance of one of the circuits is next altered to another arbitrary value to produce a different current flow therethrough, after which the two parallel circuits are again balanced by suitably adjusting a resistance in the other circuit until the same current flows through both circuits.

According to the invention, electrical characteristics, resistances, potential drops, resistance ratios, potential drop ratios and the like may be readily and accurately determined in a great variety of cases. The invention has practical application in many fields, particularly where it is desired to avoid or eliminate contact and internal instrument resistances. Thus, the invention is applicable to the determination of the electrical conductivity of chemical compounds in solution, such as electrolytes employed in the refining of metals by electrolysis; of low resistances in numerous metallurgical investigations; of resistances of grounds encountered in the power and telephone industry; of ground resistivity investigations made in geophysical explorations; of temperature determinations by means of thermo-couples or resistance thermometers; and many other important applications, especially where it is desired to carry out remote measurements. The invention can be used in connection with either alternating or direct current.

Various procedures may be followed in the practice of the invention, depending for the most part on the particular determination that is to be made. In some instances, for example, it may be desired merely to determine an unknown resistance. In other cases, it may be desirable to make a potential drop determination across a certain electrical conductor. Situations may arise where a specific unknown resistance or potential drop is not separately determinable, but in which an exceedingly valuable ratio relationship may be determined as between that resistance or potential drop and another unknown resistance or potential drop. Both the method and apparatus contemplated are sufficiently flexible to permit ready application to a variety of practical situations.

The present invention contemplates a bridge network that permits the determination of potential drop ratios or resistance ratios, while simultaneously eliminating contact and internal instrument resistance effects. This highly desirable result is accomplished by measuring the unknown potential drop or unknown resistance ratio with different bridge ratio combinations. For purposes of easy comprehension and visualization, the present invention may be said to solve electrically the problem expressed in mathematical terms:

$$X = \frac{Y+A}{Z+B} = \frac{Y+C}{Z+D}$$

in which X, Y and Z are three unknown quantities, the numerical value of X being solvable therefrom.

These and numerous other features of the present invention will undoubtedly be better understood if reference is made to the accompanying drawings, taken in conjunction with the following description, in which.

Figure 1:
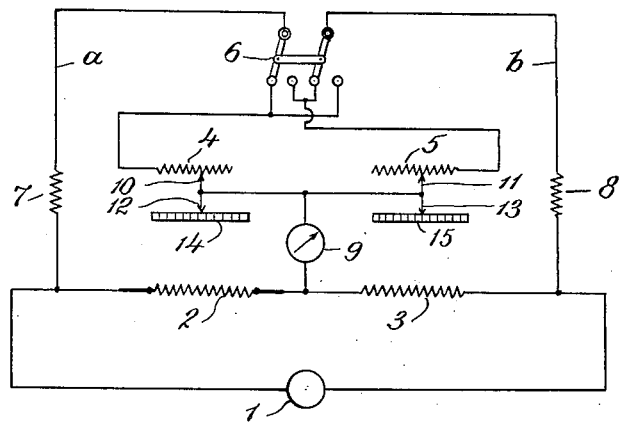
Fig. 1 is a diagrammatic representation of a form of apparatus illustrative of a practice of the invention.

Referring for the moment to Fig. 1, a bridge-network is shown consisting of two parallel circuits $a$ and $b$. A current source 1 is connected in series to an unknown electrical conductor or resistance 2 and a known or calibrated resistance 3. Appropriate terminals, electrodes, contacts or the like, are employed to connect the source of current with the electrical conductor or resistances to be investigated. These are advantageously and conveniently located at the ends of the leads coming from the current source.

A variable slide resistance 4 is connected or connectable in parallel to the unknown resistance 2; and a variable slide resistance 5 is connected or connectable in parallel to the known or calibrated resistance 3 by means of leads and a reversing, double-pole double-throw switch 6. A diagrammatically represented resistance 7, interposed in the lead between the unknown resistance 2 and the reversible switch 6 is intended to represent the combined lead and contact resistances for that part of the circuit; which for formula purposes conveniently may be represented as $R_7$. A diagrammatically represented resistance 8, interposed in the lead between the known or calibrated resistance 3 and the reversible switch 6, is intended to represent the combined lead and contact resistances for that part of the circuit; which for formula purposes may be represented as $R_8$.

A suitable current indicator or current responsive means 9 is connected in series between the common ends of the unknown resistance 2 and the known or calibrated resistance 3 and the common ends of the leads going to the variable resistances 4 and 5. This current indicator may take on any of the conventional types, such as a galvanometer, telephone, or the like. In case the signals are too weak, they may of course be suitably amplified by means not shown, but which are well known as applicable in such cases.

The variable slide resistances 4 and 5 are built in such manner that any increase or decrease in resistance, while moving contact sliders 10 and 11, occurs in straight line proportion; and which may be recognized with the help of pointers 12 and 13 operating in association with graduated scales 14 and 15, respectively. Each scale division on each scale, therefore, represents a constant amount of ohmic resistance. A scale division on scale 14 will not necessarily, however, represent as much ohmic resistance as a scale division on scale 15, or vice versa. It is not necessary for purposes of the present invention that the scales should interchangeably indicate identically the same resistance values for each scale division.

Figure 2:
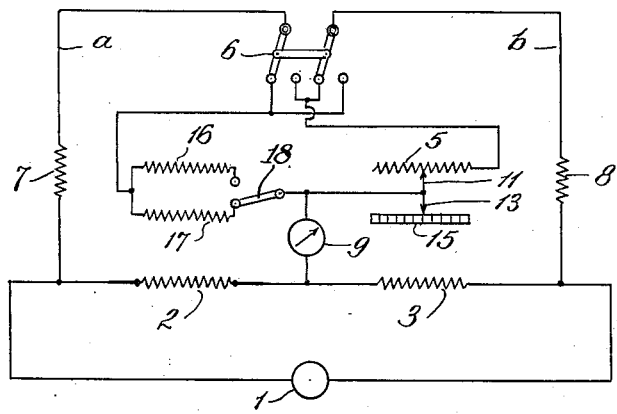
Fig. 2 is a diagrammatic representation of a modified form of apparatus.
Figure 3:
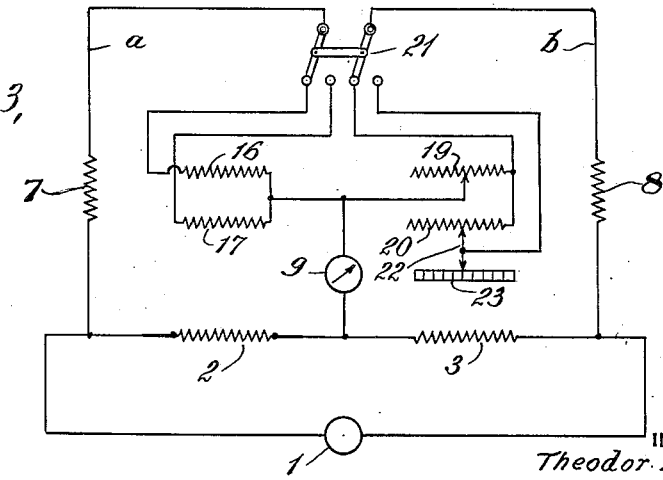
Fig. 3 is a diagrammatic representation of another modified form of apparatus.
Figure 4:
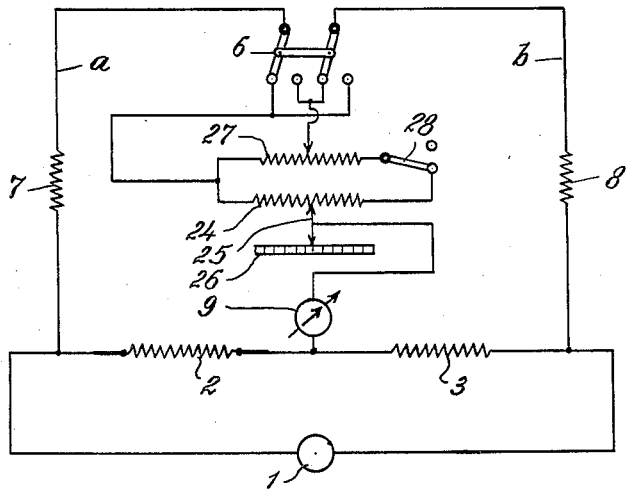
Fig. 4 is a diagrammatic representation of a further modified form of apparatus.

Before going on to a detailed discussion of Figs. 2, 3 and 4, it may be well first to consider the operation of the apparatus shown in Fig. 1, while at the same time setting out and developing pertinent formulæ and ratios employable in a practice of the invention:

Assuming that an electrical conductor 2 is under investigation, the leads going from the source of current 1 are appropriately brought in contact therewith; a conventional arrangement being conveniently set forth in Fig. 1, for example. In practical operation, the set-up would depend largely on the circumstances involved; such as the type of conductor to be studied, and in the manner in which a current can be made to pass through it.

The variable resistance 4 is set at an arbitrary value $R_4$. The bridge is then balanced by suitably adjusting the variable resistance 5. If $R_5$ is the resultant value of resistance 5, the following well known ratios obtain:

(1) $$\frac{R_2}{R_3} = \frac{R_7 + R_4}{R_8 + R_5}$$

in which:

$R_2$ = the resistance of or the potential drop across the conductor 2;

$R_3$ = the resistance of the known or calibrated resistance 3;

$R_7$ = the contact and lead or internal instrument resistance diagrammatically represented by the numeral 7;

$R_8$ = the contact and lead or internal instrument resistance diagrammatically represented by the numeral 8.

Next, the variable resistance 4 is set at another arbitrary value, which may be indicated as $R_4'$. The bridge is again balanced by suitably adjusting the variable resistance 5', the new resistance may be designated as $R_5'$. The following equation, comparable to (1) just set out, then follows:

(2) $$\frac{R_2}{R_3} = \frac{R_7 + R_4'}{R_8 + R_5'}$$

Developing Equation (1) with regard to $R_7$, the equation may be rewritten:

(3) $$R_7 = \frac{R_2}{R_3}(R_8 + R_5) - R_4$$

Developing Equation (2) with regard to $R_7$, the equation may be rewritten:

(4) $$R_7 = \frac{R_2}{R_3}(R_8 + R_5') - R_4'$$

Substituting the value of $R_7$ in Equation (3) for $R_7$ in Equation 4, and developing in regard to the ratio $$\frac{R_2}{R_3}:$$

(5) $$\frac{R_2}{R_3}(R_8 + R_5) - R_4 = \frac{R_2}{R_3}(R_8 + R_5') - R_4'$$

(6) $$\frac{R_2}{R_3}R_8 + \frac{R_2}{R_3}R_5 - R_4 = \frac{R_2}{R_3}R_8 + \frac{R_2}{R_3}R_5' - R_4'$$

(7) $$\frac{R_2}{R_3}(R_5 - R_5') = R_4 - R_4'$$

(8) $$\frac{R_2}{R_3}(R_5' - R_5) = R_4' - R_4$$

(9) $$\frac{R_2}{R_3} = \frac{R_4' - R_4}{R_5' - R_5}$$

In checking through the above equations, it will be seen that the lead and contact or internal instrument resistances $R_7$ and $R_8$ are eliminated; $R_7$ being eliminated in Equation (5) and $R_8$ in Equation (7). The net result is to obtain the true ratio between the unknown resistance $R_2$ and the known resistance $R_3$ in terms of a ratio between the change in resistance undergone by the variable resistance 4 and by the variable resistance 5.

Since movements of the slide contact arms 10 and 11, on the variable resistances 4 and 5 to obtain the desired variations and balancing, in a straight line proportion, likewise result in movements of the pointers 12 and 13, corresponding changes are indicated on scales 14 and 15. To render the procedure easy, advantage is taken of this direct relationship between changes in actual resistance of the variable resistances 4 and 5 and changes in the scale readings.

Each scale division of scales 14 and 15 represents a certain ohmic resistance, although, as pointed out above, the ohmic resistance may vary per scale division as between the two scales; each scale division for each separate scale, however, representing a constant amount of ohmic resistance. Advantage may be taken of this simple straight line relationship to determine numerically the ohmic value of the apparatus per scale division.

Assuming that $k_4$ represents the ohmic resistance per scale division on scale 14 of the variable resistance 4, and that $k_5$ represents the ohmic resistance per scale division on scale 15 of the variable resistance 5, and that $\alpha$ and $\alpha'$ are the two scale settings of variable resistance 4, and that $\beta$ and $\beta'$ are the two scale settings of variable resistance 5, then the Equation (9) may be rewritten in this manner:

(10) $$\frac{R_2}{R_3} = \frac{\alpha' - \alpha}{\beta' - \beta} \times \frac{k_4}{k_5}$$

The ratio $$\frac{k_4}{k_5}$$

may advantageously be called the instrument constant $k$; which, substituted for $$\frac{k_4}{k_5}$$

in Equation (10), results in the following formula:

(11) $$\frac{R_2}{R_3} = \frac{\alpha' - \alpha}{\beta' - \beta} \times k$$

A study of Equation (11) indicates that the correct ratio $$\frac{R_2}{R_3}$$

which is the ratio of the unknown resistance 2 of the electrical conductor under investigation to the resistance of the known or calibrated resistance 3, may be computed with the help of the different scale readings and the instrument constant. Further consideration of this equation also indicates that all of the values have now been indicated as definitely ascertainable, except $R_2$ and $k$. It is therefore clear that if the value of $k$ may be found, the value of $R_2$ may then be computed.

The value of $k$ may be determined by reversing switch 6, and repeating the measuring procedure outlined above. It will of course be understood that the determination of the instrument constant may be conducted at any time. In fact it should be checked from time to time, as conditions warrant.

Assuming that $\alpha''$ and $\alpha'''$ represent the new settings on altering the variable resistance 4; and that $\beta''$ and $\beta'''$ represent the new settings on altering the variable resistance 5, then the following equation obtains:

(12) $$\frac{R_2}{R_3} = \frac{\beta''' - \beta''}{\alpha''' - \alpha''} \cdot \frac{k_5}{k_4}$$

Substituting the constant $k$ for the ratio $$\frac{k_4}{k_5}$$

in Equation (12):

(13) $$\frac{R_2}{R_3} = \frac{\beta''' - \beta''}{\alpha''' - \alpha''} \times \frac{1}{k}$$

Substituting the value of $$\frac{R_2}{R_3}$$

in Equation (13) for $$\frac{R_2}{R_3}$$

in Equation (11), and solving for the value of $k$:

(14) $$\frac{\beta''' - \beta''}{\alpha''' - \alpha''} \cdot \frac{1}{k} = \frac{\alpha' - \alpha}{\beta' - \beta} \cdot k$$

(15) $$k^2 = \frac{\beta' - \beta}{\alpha' - \alpha} \cdot \frac{\beta''' - \beta''}{\alpha''' - \alpha''}$$

(16) $$k = \sqrt{\frac{\beta' - \beta}{\alpha' - \alpha} \cdot \frac{\beta''' - \beta''}{\alpha''' - \alpha''}}$$

An examination of the last equation will indicate that the numerical value of the instrument constant $k$ may be obtained, since each of the values for $\alpha, \alpha', \alpha'', \alpha''', \beta, \beta', \beta''$ and $\beta'''$ are ascertainable; and hence the value of $k$ may be readily computed. Substituting the numerical value of $k$ obtained in the solution of this equation for $k$ in Equation (11), it will at once be seen that the numerical value of $R_2$ for the unknown resistance, or potential drop, may be computed.

Referring now to Fig. 2, a variation or modification of the practice illustrated in Fig. 1 may be observed. In operating the apparatus of Fig. 1, it will be recalled that the slider 10 on the variable resistance 4 may be successively set at two arbitrary values; in which case the bridge is in each instance balanced. Since two arbitrary resistance values are thus employed, it is possible to replace the variable slide resistance 4 by two or more fixed but different resistances; that may be used in suitable combinations to effect the desired variations in resistance on one side of the bridge, only to be balanced by suitable adjustments of the variable resistance 5 on the other side of the bridge. Such a practice is diagrammatically illustrated in Fig. 2, where fixed but different resistances 16 and 17 are in effect substituted for the single variable resistance 4 of Fig. 1. A single-pole double-throw switch connects either resistance 16 or resistance 17 to the variable slide resistance 5.

When using the apparatus arrangement illustrated in Fig. 2, Equation (11) may be rewritten in this manner:

$$(17) \quad \frac{R_2}{R_3} = \frac{c}{\beta' - \beta}$$

in which:
$c =$ the new instrument constant numerically corresponding to the product $(\alpha' - \alpha)k$ from Equation (11).

The numerical value of $c$ may be determined in the same manner as the value of $k$ in the equation above. That is to say, after taking a set of readings with resistance 17 in series with the variable resistance 5, a set of readings is taken with the resistance 16 in series with the variable resistance 5. The change from resistance 17 to resistance 16 is obtained by throwing over the single-pole double-throw switch 18. In each case, the value of the variable resistance 5 is of course changed by moving the slide contact arm 11 until a balanced condition is obtained. Also, the scale readings indicated by the pointer 13 on the scale 15 are in each case noted.

A similar set of readings is then taken after the double-pole double-throw switch 6 has been reversed. In this case, the following equation obtains:

$$(18) \quad \frac{R_2}{R_3} = \frac{\beta''' - \beta''}{c}$$

Substituting the value of the ratio $$\frac{R_2}{R_3}$$

of Equation (18) for the value of $$\frac{R_2}{R_3}$$

in Equation (17), and solving for $c$;

$$(19) \quad \frac{\beta''' - \beta''}{c} = \frac{c}{\beta' - \beta}$$

$$(20) \quad c^2 = (\beta' - \beta)(\beta''' - \beta'')$$

$$(21) \quad c = \sqrt{(\beta' - \beta)(\beta''' - \beta'')}$$

Referring back to Equation (17), it will be clear that the computation would be simplified if the setting $\beta$ could be identified with a zero point on the scale 15. In such a case Equation (17) could be simplified to read:

$$(22) \quad \frac{R_2}{R_3} = \frac{c}{\beta'}$$

In other words, this means that the scale 15 may be calibrated directly in values of the true ratio $$\frac{R_2}{R_3}$$

or any other corresponding function. An apparatus adapted for such a practice is diagrammatically illustrated in Fig. 3, which is operated in principle substantially in accordance with the arrangements indicated for Figs. 1 and 2, except that the variable resistance 5 is replaced by slide resistances 19 and 20; and that the single-pole double-throw switch 18 as well as the double-pole double-throw switch 6 (of Figs. 1 and 2) are replaced by a double-pole double-throw switch 21. This latter switch connects either resistance 16 and resistance 19, or resistance 17 and resistance 19, in series with resistance 20 to the indicator 9.

In the first position, i. e. when the switch 21 connects resistances 16 and 19 in series with resistance 20, the resultant setting of resistance 19 corresponds to the setting of the single slide resistance 5 in Figs. 1 and 2. Reversing switch 21 and leaving resistance 19 untouched, the net-work may be re-balanced by altering resistance 20 with sliding contact arm 22. Using a suitable scale 23, it is evident that this scale may be calibrated as to the true ratio $$\frac{R_2}{R_3}$$

or as to any other suitable and corresponding function.

Switch 21 may be replaced by a rotating commutator arrangement, not shown, which makes and breaks the different functions continuously. Using this commutating arrangement, the true ratio $$\frac{R_2}{R_3}$$

may then be determined by simultaneous adjustment of resistance 19 and resistance 20; thereby insuring greater accuracy in case of fluctuating potential drops.

A further modified form of apparatus may be employed in a practice of the invention, such as is more particularly and diagrammatically illustrated in Fig. 4. As in the case of Figs. 1, 2 and 3, a source of power 1 is connected in series by suitable leads to an unknown resistance 2 and a known or calibrated resistance 3. Shunted across the unknown resistance 2 and the known resistance 3 is a potentiometer 24, provided with a pointer 25, in association with a graduated scale 26. A fixed resistance 27 is provided across the potentiometer by means of a single-pole double-throw switch 28.

A reversing switch 6 is interposed between the potentiometer 24 and its accompanying resistance 27 and the source of current 1. A diagrammatically represented resistance 7 is assumed to represent the contact and lead or internal instrument resistances for circuit $a$; and a diagrammatically represented resistance 8 is assumed to represent the contact and lead or internal instrument resistances for circuit $b$.

When the single-pole double-throw switch 28 is in the open position, that is, when the resistance 27 is not connected across the potentiometer, the following equation holds:

(23) $$\frac{R_2}{R_3} = \frac{R_7 + \frac{\delta}{s} R_{24}}{R_8 + \frac{s-\delta}{s} R_{24}}$$

in which:

$s$ = the total number of divisions of scale 26;
$\delta$ = the setting of the pointer 25.

On closing the switch 28, the balance is disturbed and may be re-established by setting the pointer 25 at a neutral point, which for formula purposes may be designate as $\delta'$. The following equation then obtains:

(24) $$\frac{R_2}{R_3} = \frac{i_7 R_7 + i_{24} \frac{\delta'}{s} R_{24}}{i_8 R_8 + i_{24} \frac{s-\delta'}{s} R_{24}}$$

in which:

$i$ = the current passing through the circuits
$i_{24}$ = the current passing through the potentiometer 24
$i_7 = i_8$ = the current flowing from the current source to the potentiometer.

Assuming that the current flowing through the fixed resistance 27 is $i_{27}$, the following equation holds:

(25) $$i_7 = i_{27} + i_{24}$$

Since the potential drop across the potentiometer 24 is identical to the potential drop across the resistance 27, the following relation obtains:

(26) $$i_{27} R_{27} = i_{24} R_{24}$$

which rewritten may be indicated as follows:

(27) $$i_{27} = \frac{i_{24} R_{24}}{R_{27}}$$

Substituting the value of $i_{27}$ in Equation (27) for $i_{27}$ in Equation (25):

(28) $$i_7 = i_{24} \frac{R_{24}}{R_{27}} + i_{24} = i_{24} \frac{R_{27} + R_{24}}{R_{27}}$$

Solving for $i_{24}$:

(29) $$i_{24} = i_7 \frac{R_{27}}{R_{27} + R_{24}}$$

Regarding the ratio $$\frac{R_{27}}{R_{27} + R_{24}}$$

as the numerical equivalent of an instrument constant $m$, Equation (29) may be rewritten:

(30) $$i_{24} = i_7 m$$

Then substituting the value of $i_{24}$ of Equation (30) for $i_{24}$ in Equation (24), recalling that the value of $i_7$ is equal to the value of $i_8$, and cancelling out the value of $i_7$ common to both sides of the ratio:

(31) $$\frac{R_2}{R_3} = \frac{R_7 + m\frac{\delta'}{s} R_{24}}{R_8 + m\frac{s-\delta'}{s} R_{24}}$$

An inspection of Equations (23) and (31) will show that they are similar to Equations (1) and (2) above set out. Without indicating the intermediate equations, but going through the transformations set out in Equations (3) to (8), inclusive, the following equation results:

(32) $$\frac{R_2}{R_3} = \frac{m\frac{\delta'}{s} R_{24} - \frac{\delta}{s} R_{24}}{m\frac{s-\delta'}{s} R_{24} - \frac{\delta'}{s} R_{24}}$$

which may be simplified by cancelling out the expression $$\frac{R_{24}}{s}$$

common to both sides of the ratio:

(33) $$\frac{R_2}{R_3} = \frac{m\delta' - \delta}{m(s-\delta') - (s-\delta)}$$

The numerical value of the constant $m$ may be determined by computation, when utilizing the known values for $R_{24}$ and $R_{27}$; or in the manner described for the determination of the instrument constants $k$ and $c$. Various such procedures may be followed, the ultimate object of course being to determine numerically the value of the instrument constant $m$.

In some cases, it may be desirable to make the measurements or determinations automatic. The apparatus shown in Figs. 1, 2, 3 and 4 is adapted for manual operation, although in principle automatic features may be associated therewith. Automatic measurements are particularly desirable in cases where it is advantageous to obtain continuous or permanent records. An apparatus for conducting automatic determinations is diagrammatically illustrated in Fig. 5. Essentially the same principles and procedures employed with respect to the apparatus of Figs. 1, 2, 3 and 4 are here likewise employed.

Figure 5:
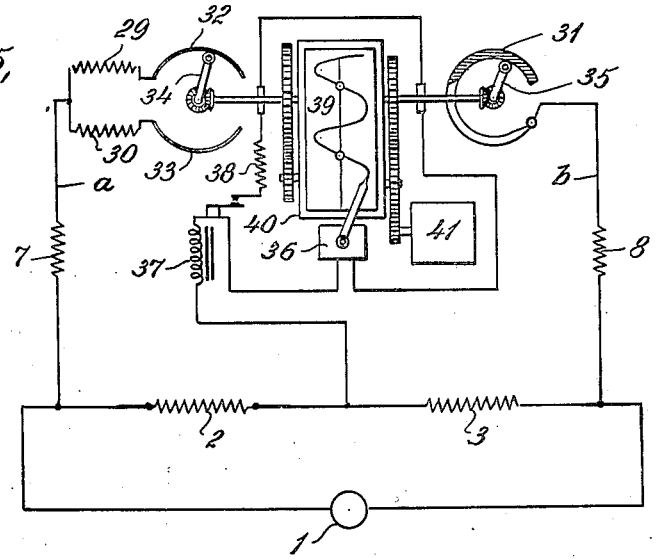
Fig. 5 is a diagrammatic representation of a modified form of apparatus adapted automatically to record electrical characteristics of an electrical conductor.

Referring then to Fig. 5, it will be seen that the current source 1 is connected in series with the unknown resistance 2 and the known or calibrated resistance 3. The unknown resistance or potential drop, for example, may be a fluctuating one; as in the case of varying concentrations of electrolyte in the electrolytic refining of metals. Shunted parallel to resistances 2 and 3 are fixed resistances 29 and 30 connecting with a variable slide resistance 31. Resistances 29 and 30 are successively connected to the slide resistance 31 by means of contact segments 32 and 33 and rotating contact arms 34 and 35 which are further connected to an indicator branch consisting of a recording indicator 36 in series with a by-pass relay 37 and shunted by a pass relay resistance 38. The purpose of the by-pass relay is to provide a safety guard against damage to the indicator by abnormal current strength which is accomplished by shunting the resistance 38 across the indicator.

Any movement of indicator 36 is recorded upon a moving chart 39, which in turn is part of a suitable recorder 40 operated by a spring or clock motor 41.

The recorder is connected by a suitable gearing arrangement to the contact arms 34 and 35, rotating them synchronously with the movement of the chart 39. The indicator chart is preferably divided into cycles of an arbitrary number of scale divisions. One cycle, for example, corresponds to one complete turn of contact arm 35 and one-half turn of contact arm 34. During every revolution of contact arm 34, the bridge is in balance only twice. The value of the balancing readings of the slide resistance 31 depends upon the relative position of contact arm 34 in association with contact segments 32 or 33. The current variation through the indicator branch changes with different positions of contact arm 35 and is recorded upon chart 39 as a wave line; a zero current condition or balance being indicated, and taking place whenever the wave line crosses the neutral line of the indicator chart with a gradual movement.

It is evident from the above description that one full revolution of contact arm 35 or two full revolutions of contact arm 34 are identical with one complete manual reading, as expressed by Equation (17). Applying the same equation here, and noting the number of scale divisions for two successive cycles on which the resultant wave line crosses the neutral line, the value of $c$ may be determined by following the same procedure described for the bridge combinations exemplified in Figs. 1, 2, 3 and 4.

By varying the speed of the motor 41, the speed of the automatic recorder may be changed at will. While this arrangement permits the making of continuous records, in some instances it may be satisfactory to take only intermittent readings separated at suitable time intervals. This may be accomplished by using a clock work which operates the motor 41 for short periods in suitable time intervals, the periods of course being long enough to permit at least one complete reading. Numerous modifications to effect a satisfactory automatic measuring or recording device in conjunction with the method here disclosed may undoubtedly be designed and applied by those skilled in the art.

If an alternating current source is to be employed, provision must be made for the adjustment of phase differences between the different bridge branches. This may be accomplished, for example, by the use of a variometer or equivalent arrangement, properly placed in line with the source of current and the resistances.

Those skilled in this art will realize that the principles of the present invention are applicable in a variety of cases. Thus, the invention may be employed in the determination of potential drop ratios, the ratios thus determined proving highly useful. The distribution of natural earth currents may be studied and recorded in accordance with a practice of the present invention. In this case, for example, grounded electrodes spaced in a north-south and east-west direction may be connected to two parallel circuits in a bridge network. The potential drop ratios between the grounded electrodes may be determined at suitable time intervals. In this manner, important information may be obtained in regard to variations in the earth's magnetic field. Similar potential drop ratios may of course be determined with respect to other materials to be investigated.

The improvements herein described represent important advances in the technique of making bridge measurements. The invention may, for example, find application in extending the range of usefulness and accuracy of the well known Kelvin bridge; especially in regard to remote resistivity measurements. Whereas the Kelvin bridge must be employed relatively close to the conductor to be investigated, the improvements of the present invention make it possible to employ the Kelvin bridge at remote distances from the conductor or object under investigation.

Various modifications may of course be made to the method and apparatus of the invention without departing from the spirit of the invention.

I claim:

1. In a method of determining the electrical characteristics of an electrical conductor, the steps which comprise utilizing a current flow through the conductor connected in series with a reference conductor, also shunting a part of said current flow through two parallel circuits in bridge relationship with said conductor and reference conductor, balancing said two parallel circuits in regard to their current flow by altering the value of resistance in at least one of the circuits, un-balancing the bridge by changing the value of resistance in at least one of the circuits, and then re-establishing a balanced condition of the bridge by adjusting the value of another resistance in at least one of the circuits.

2. In a method of determining the electrical characteristics of an electrical conductor, the steps which comprise utilizing a current flow through the conductor connected in series with a known resistance, also shunting a part of said current flow through two parallel circuits in bridge relationship with said conductor and known resistance, balancing said two parallel circuits in regard to their current flow by altering the value of resistance in at least one of the circuits, un-balancing the bridge by changing the value of resistance in at least one of the circuits, and then re-establishing a balanced condition of the bridge by adjusting the value of another resistance in at least one of the circuits.

3. In a method of determining the electrical characteristics of an electrical conductor, the steps which comprise producing a current flow through the conductor connected in series with a known resistance, also producing a current flow in two parallel circuits in bridge relationship with said conductor and known resistance, each of said parallel circuits being provided with at least one variable resistance, setting the variable resistance of one of said parallel circuits at an arbitrary value, balancing the two parallel circuits by suitably adjusting the variable resistance in the other parallel circuit until the same current flows through both circuits, altering the variable resistance of one of said circuits to another arbitrary value to produce a different current flow therethrough, and again balancing said two parallel circuits by suitably adjusting the variable resistance in the other circuit until the same current flows through both circuits.

4. In a method of determining the electrical characteristics of an electrical conductor, the steps which comprise producing a current flow from a current source through the conductor connected in series with a known resistance, also producing a current flow from the same current source through two parallel circuits in bridge relationship with said conductor and known resistance in the form of a bridge network with the conductor in one circuit and the known resistance in the other circuit, setting a variable resistance of one of said parallel circuits at an arbitrary value, balancing the two parallel circuits by suitably adjusting a variable resistance in the other parallel circuit until the same current flows through both circuits, altering the variable resistance of one of said circuits to another arbitrary value to produce a different current flow therethrough, and again balancing said two parallel circuits by suitably adjusting the variable resistance in the other circuit until the same current flows through both circuits.

5. In an apparatus for determining the electrical characteristics of an electrical conductor, the combination comprising a reference conductor connectable in series with an electrical conductor to be investigated, two circuits parallel respectively with the reference conductor and the conductor to be investigated and connectable in bridge relationship with said reference conductor and the conductor to be investigated and containing a common variable resistance so arranged that an increase of resistance in one parallel circuit is accompanied by a corresponding decrease of resistance in the other parallel circuit, and a shunt containing a fixed resistance connectable in parallel with the common variable resistance of the two parallel circuits.

6. An apparatus according to claim 5, in which a reversing switch is provided in the circuits, each of said circuits being provided with at least one fixed resistance, and a variable resistance so constructed that an increase of resistance in one parallel circuit is accompanied by a corresponding decrease in the other circuit, and a fixed resistance connectable as a shunt with the variable resistances.

7. An apparatus according to claim 5, in which a scale is associated with the common variable resistance, said scale being calibrated in terms of a ratio function between the electrical characteristics of the reference conductor and the conductor to be investigated.

THEODOR ZUSCHLAG.